(12) United States Patent
Kettwig et al.

(10) Patent No.: US 9,090,389 B2
(45) Date of Patent: Jul. 28, 2015

(54) MAKING A PACKAGE OF PLASTIC FILM

(75) Inventors: Marco Kettwig, Troisdorf (DE);
Hartmut Odenthal, Troisdorf (DE)

(73) Assignee: LEMO MASCHINENBAU GmbH, Niederkassel-Mondorf (DE)

( * ) Notice: Subject to any disclaimer, the term of this patent is extended or adjusted under 35 U.S.C. 154(b) by 234 days.

(21) Appl. No.: 13/575,950

(22) PCT Filed: Feb. 1, 2011

(86) PCT No.: PCT/EP2011/000448
§ 371 (c)(1),
(2), (4) Date: Dec. 9, 2012

(87) PCT Pub. No.: WO2011/116851
PCT Pub. Date: Sep. 29, 2011

(65) Prior Publication Data
US 2013/0071585 A1  Mar. 21, 2013

(30) Foreign Application Priority Data

Mar. 23, 2010 (DE) .......................... 10 2010 012 559

(51) Int. Cl.
*B65D 71/06* (2006.01)
*B65D 71/08* (2006.01)
*B29D 22/00* (2006.01)
*B65B 17/02* (2006.01)
*B65B 21/24* (2006.01)

(52) U.S. Cl.
CPC ............ *B65D 71/066* (2013.01); *B29D 22/003* (2013.01); *B65D 71/08* (2013.01); *B65B 17/02* (2013.01); *B65B 21/245* (2013.01); *B65D 2203/02* (2013.01); *Y10T 428/1334* (2015.01)

(58) Field of Classification Search
CPC ..... B65D 75/30; D65D 71/066; B29D 22/003
USPC ................................... 53/397–398, 441–442
See application file for complete search history.

(56) References Cited

U.S. PATENT DOCUMENTS

2011/0056175 A1  3/2011  Harness

*Primary Examiner* — Michelle Lopez
(74) *Attorney, Agent, or Firm* — Andrew Wilford

(57) ABSTRACT

A package of plastic film for articles to be packaged is made by first forming in an inner layer of longitudinally extending plastic film or in an outer layer of longitudinally extending plastic film a plurality of longitudinally spaced labels each having an outer periphery releasably joined to the respective layer. The inner and outer layers are juxtaposed and welded together along transverse welds between the labels so as to form between the layers a longitudinal row of compartments each having a respective one of the labels. A respective article is inserted into each of the compartments a respective article. Only the labels are adhered to the respective articles such that when one of the articles is removed from the respective compartment the respective label is separated from the respective layer and stays on the removed article.

9 Claims, 2 Drawing Sheets

MAKING A PACKAGE OF PLASTIC FILM

CROSS REFERENCE TO RELATED APPLICATIONS

This application is the US-national stage of PCT application PCT/EP2011/000448 filed 1 Feb. 2011 and claiming the priority of German patent application 102010012559.8 itself filed 23 Mar. 2010.

FIELD OF THE INVENTION

The invention relates to a method of making a package of plastic film for an article to be packaged, in particular containers, in which an inner layer of plastic film is welded to an outer layer of plastic film by a transverse weld so as to create compartments between the inner and outer layers, an apparatus for making packaging material of plastic film for packing products, in particular for containers, a packaging material for articles to be packaged, in particular for containers, and an outer packaging material for containers, of layers of plastic film that create one or more compartments for the containers.

BACKGROUND OF THE INVENTION

WO 2009/143248 [WO 2009/149248; US 2011/0056175] discloses a method of making packaging material and a method for filling packaging material with liquid containers. The packaging material with multiple compartments is produced here out of a shrinkable plastic film that after being heated is shrunk around the liquid containers in the compartments. The packaging material can include perforations that enable the packaged product to be removed from the packaging material.

In the known method, the labels are applied individually and in a separate process step to the containers. These labeled container are then packed, for example, in a shrink-wrapped packaging material.

OBJECT OF THE INVENTION

The object of this invention is therefore to provide a method by which labeling and packaging of containers can be done in a simplified manner.

SUMMARY OF THE INVENTION

The object is attained according to the invention by an approach whereby part of the inner layer and/or part of the outer layer is formed as the label for the article to be packaged, such that the shape of the labels is formed, in particular punched in, each time before transverse welding, which label remains on the article to be packaged when the article to be packaged is removed from its compartment.

The advantageous aspect here is that no upstream process steps are required for applying the label to the article to be packaged by the method according to the invention. The product to be packaged can also be marked individually or identified individually without prelabeling in the packaging material without consuming additional material. The reduced process steps enable the product batch sizes to be increased, and the set-up costs and times to be reduced as compared with upstream labeling.

Two juxtaposed inner layers of plastic film are welded at a transverse weld, an additional outer layer of plastic film is then laid on the two welded inner layers and welded to the welded-together inner layers by a transverse weld so as to create compartments between the inner layers and the respective outer layers, such that respectively part of the outer layer and/or part of the inner layer are preferably formed as a label for the article to be packaged.

The labels are preferably each positioned in the region of the compartments.

A perforation line or a precut is preferably formed on the outer periphery of a label in the outer layer to release the label from the outer layer, and the labels are preferably provided with a reactive adhesive, preferably a hot-melt adhesive, on the outer layer, in particular on the face of the outer layer turned toward the inner layer, and/or a perforation line or a precut is preferably formed on the outer periphery of a label in the inner is layer to release the label from the inner layer, and the labels in the inner layer are preferably provided with a reactive adhesive, preferably with a hot-melt adhesive, on the inner layer, in particular on the face of the inner layer turned toward the outer layer. In a precut, the contour of a label is cut out except for a few retaining webs.

In any case before transverse welding, a perforation line is formed, in particular punched into at least one outer layer and/or at least one inner layer for the purpose of opening the compartment.

A perforation line is preferably formed, preferably, punched through all of the welded layers after a predetermined number of compartments.

On the other side of the already welded layers, a second additional outer layer of plastic film is preferably laid on the already welded inner layers, while the second additional outer layer is preferably welded to the second inner layer so as to create compartments between the second inner layer and the additional outer layer. This creates a packaging material comprising two rows of compartments.

A bidirectionally shrinkable plastic film is preferably used at least for the outer layer. This approach enables the article to be packaged to be secured in place in the compartments by shrinking the film.

The layers to be welded are preferably welded by a transverse welding bar.

BRIEF DESCRIPTION OF THE DRAWING

The four figures show preferred embodiments according to the invention. Therein.

SPECIFIC DESCRIPTION OF THE INVENTION

The following discussion describes in more detail a method according to the invention and an apparatus for carrying out the method.

In making a packaging material according to the invention, four layers 1, 2, 3, 4 are preferably used to create two rows of compartments. This enables compact packaging material labels to be produced having, for example, six compartments (2×3 six-packs).

Figure 1:
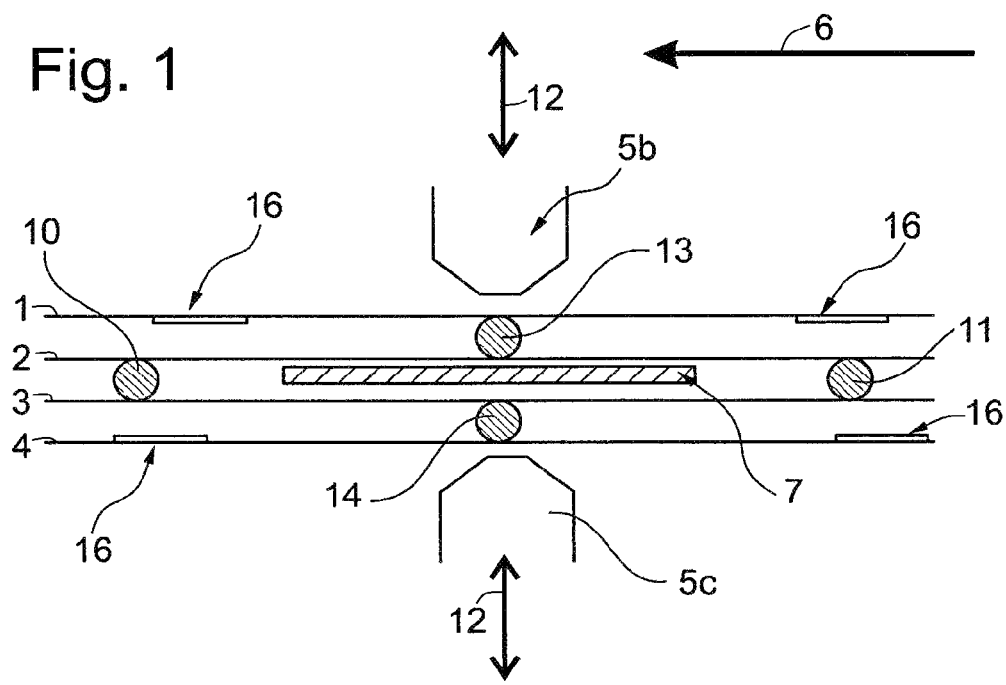
FIG. 1 is a front view showing the welding of multiple layers of plastic film so as to create compartments according to the invention.

All four layers 1, 2, 3, 4 of plastic film are juxtaposed one on the other to produce packaging material for articles to be packaged, in particular containers. This yields two outer layers 1, 4, and two inner layers 2 and 3 as seen in FIG. 1. Here, for example, all four layers 1, 2, 3, 4 are transparent. Alternatively, the layers 1, 2, 3, 4 can also be of an opaque plastic film. It is possible for at least one of the layers 1, 2, 3, 4 to be printed. Only the two outer layers 1 and 4 are each printed in the illustrated example. A bidirectionally shrinkable plastic film is used at least for at least the outer layers 1 and 4. A bidirectionally shrinkable plastic film is used in the example for the two outer layers 1 and 4 in order to secure an article to be packaged in the compartments.

The packaging material produced in the example for liquid containers is for making a package of six bottles. The bottles are arranged in the packaging material here with each bottle in a respective compartment, such that the six individual bottles are arranged in a package in two rows with three articles per row. Alternatively, packaging material for other items can also be produced by the method according to the invention, which items, for example, are a can or have a different shape.

The packaging material can also accommodate the relevant items in a different arrangement, i.e. the packaging material can be designed to enable it to accommodate items in, for example, 4×2 or 2×2 arrays.

In the example, individual films of plastic are preferably used in each case for the four layers 1, 2, 3, 4. The four layers 1, 2, 3, 4 are each fed continuously by rollers to the apparatus for making the packaging material. Alternatively, the four layers 1, 2, 3, 4 can also be produced from a half-tube that is divided into individual films. Alternatively, the four layers 1, 2, 3, 4 can also each be produced from a plastic film tube that is divided up into individual films.

Figure 2:
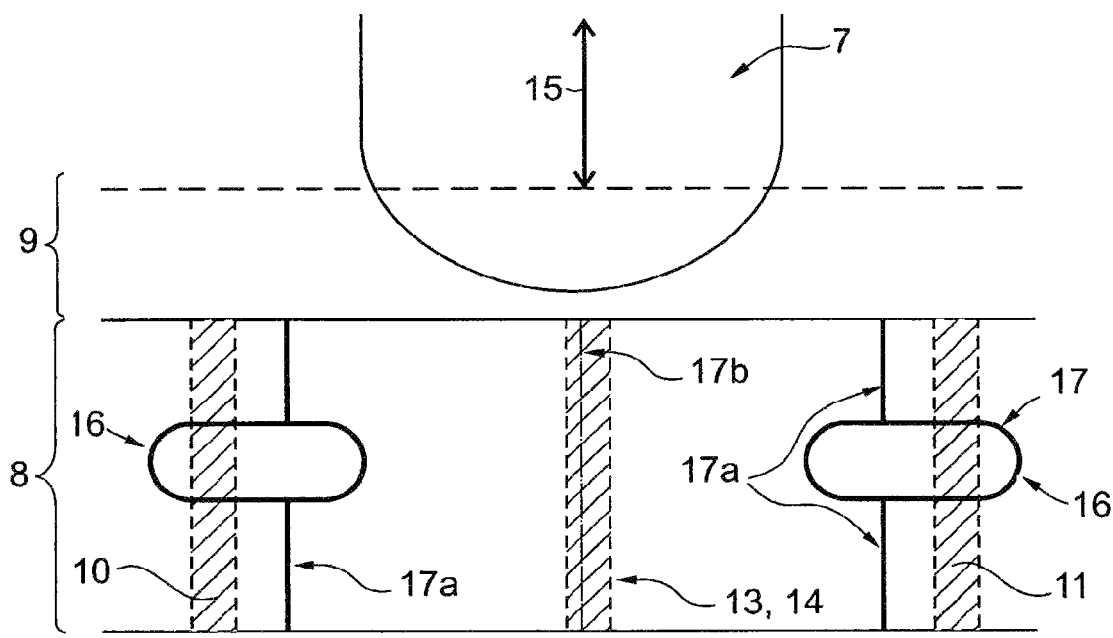
FIG. 2 is a top view showing the welding of multiple layers of plastic film according to the invention.

FIGS. 1 and 2 show the apparatus in simplified form. The following discussion first illustrates the feeding and processing of both the inner layers 2 and 3.

Both the inner layers 2 and 3, which are each fed in over rollers, are each oriented by a turning apparatus in a feed direction 6 such that these two layers 2 and 3 are juxtaposed one above the other. The width of the two layers 2 and 3 is subdivided into two regions, a weld region 8 and a border region 9. The continuous feed of both the layers 2 and 3 is converted to a discontinuous stepping motion to enable welding. Both the inner layers 2 and 3 are welded in a welding station at predetermined positions to produce the packaging material of the illustrated embodiment.

The following discussion relates to the welding of both the inner layers 2 and 3 at only two positions by way of example for the packaging material according to the invention. The two discontinuously fed-in inner layers 2 and 3 are fed to a transverse welding bar 5*a* (not shown) in the feed direction 6. The transverse welding bar 5*a* welds both the inner layers 2 and 3 together at a transverse weld 10 at a pause in the discontinuous motion. To do this, the transverse welding bar 5*a* is lowered over the weld region 8 of both the inner layers 2 and 3 onto both the inner layers 2 and 3, and welds them to each other. The transverse bar 5*a* then lifts off both the inner layers 2 and 3. The length of the transverse bar 5*a* corresponds to the maximum width of the weld region 8. The transverse welding bar 5*a* extends here perpendicular to the feed direction 6 of the inner layers 2 and 3. Both the inner layers 2 and 3 subsequently move further along the feed path by approximately 9 cm in the example in the feed direction 6 until they stop during the next pause. Once again, the transverse welding bar 5*a* is lowered onto both the inner layers 2 and 3 so as to weld together both the inner layers 2 and 3 at another transverse weld 11. The transverse bar 5*a* then lifts off both the welded inner layers 2 and 3. This enables both the inner layers 2 and 3 to again move farther along the feed path in the feed direction 6. The length of the transverse welding bar 5*a* is selected so that transverse welds 10 and 11 of the inner layers 2 and 3 terminate at a predetermined spacing from the longitudinal edge of the inner layers 2 and 3, thereby creating the border region 9 in which there are no welds.

The tip of a splitter tongue 7 is inserted into the border region 9 between the inner layers 2 and 3. This insertion occurs once at the start of production. As a result, it is then possible to weld the respective outer layers 1 and 4 to the respective adjacent inner layers 2 and 3 along the length of the inserted tongue 7, without welding both the inner layers 2 and 3 to each other once again. The splitter tongue 7 is coated for example with Teflon.

Both the outer layers 1 and 4 are fed continuously to the apparatus over rollers before both the outer layers 1 and 4 are welded to the respective adjacent, already welded inner layers 2 and 3. Both the outer layers 1 and 4 are oriented in the feed direction 6 by turning apparatuses, thereby enabling both the outer layers 1 and 4 to be laid on both the inner layers 2 and 3.

The following discussion describes both the outer layers 1 and 4 in detail.

Part of each outer layer 1 and 4 is provided with spaced printed labels 16 for the articles to be packaged. The labels 16 are provided before transverse welding. In the example, the shape of the labels 16 is punched in so as to form on the outer periphery of the label 16 a perforation line 17 or a precut for removing the label 16. A single such perforation line 17 is punched around each of the labels 16 in the example of FIG. 3. The labels 16 punched into the outer layers 1 and 4 are each provided with a reactive adhesive—a hot-melt adhesive 18 in the example—on the inner face turned toward the respective outer layer 1 or 4 and inner layer 2 or 3. The printed labels 16 here are each oriented centrally relative to the layer width and compartment width in the region of the compartments that are formed after transverse welding.

Figure 3:
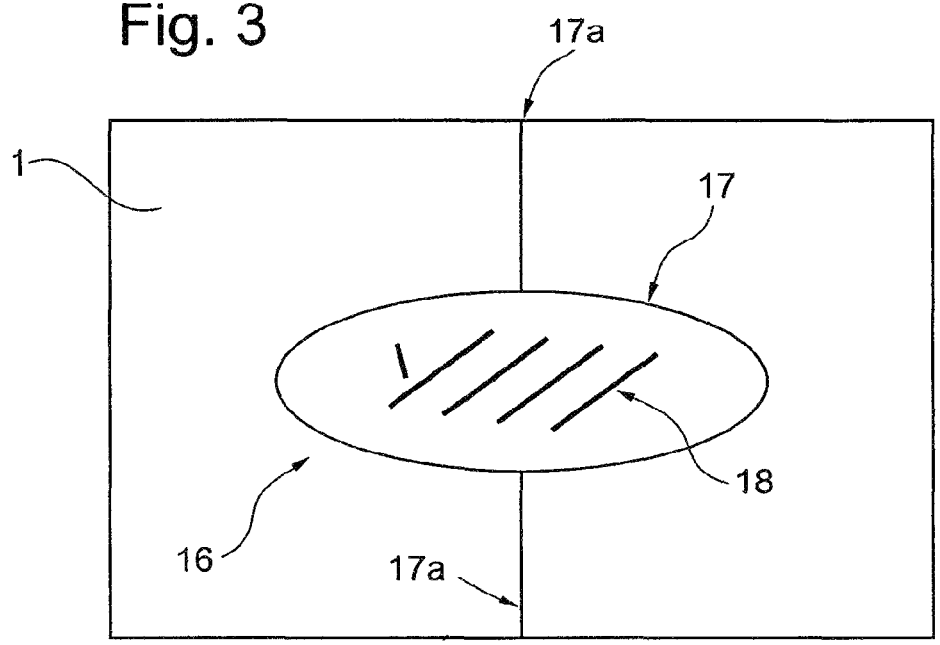
FIG. 3 is a section through an outer layer of plastic film including a label.

FIG. 3, for example, shows the label 16 of round shape held by parts of the outer layer 1. The design of the label 16 is identical on the other outer layer 4. Alternatively, the shape of each the label 16 can be rectangular or of any other desired shape.

At least one additional perforation line 17*a* is also formed in at least one of the outer layers 1 and 4 and/or in at least one of the inner layers 2 and 3, always before transverse welding. Two of the perforation lines 17*a* are periodically punched exclusively into both the outer layers 1 and 4 in the illustrated example. The perforation lines 17*a* are here perpendicular to the feed direction 6 of both the outer layers 1 and 4. In the is illustrated example, only the perforation lines 17*a* of the outer layers 1 are shown for a single compartment as indicated in FIG. 3. The design is identical for other outer layer 4. As indicated in FIG. 3, one perforation line 17*a* extends in a straight line from one of both edges of the outer layer 1 to the perforation line 17 that encircles the label 16. Both the perforation lines 17*a* are used to open the compartment. Alternatively, the perforation line 17*a* can also be of any other desired shape, for example, arcuate.

In the illustrated embodiment, the continuous feed of both the outer layers 1 and 4 is converted to a discontinuous stepping motion in order to punch the labels 16 and perforations 17, 17*a* into both the outer layers 1 and 4.

To provide pattern-matching positioning of the two outer layers 1 and 4 relative to the already welded inner layers 2 and 3, the position of the layers is sensed at each step by (unillustrated) sensors. The position of both the outer layers 1 and 4 in the example is detected by an optical sensor that in the illustrated embodiment detects the position of a print mark repeated on each outer layer 1 and 4. The position of the already welded inner layers 2 and 3 in the example is detected by another optical sensor that detects the position of a print mark and/or a product-specific feature, in particular a weld. Here, the position of the transverse welds 10 and 11 of the welded-together inner layers 2 and 3 is detected by the optical sensor. Whenever the relative position of one of the outer layers 1 and 4 deviates from that of the welded-together inner layers 2 and 3, the position of the outer layers 1 and 4 relative to the position of the welded-together inner layers 2 and 3 is corrected by a change in longitudinal dimension brought about by stretching or relaxation. To this end, the outer layers 1 and 4 are each surrounded by deflectable rocker arms (not shown). The deflection of the rocker arms is effected here by a pneumatic cylinder that is controllable by a proportional valve. The deflection of each rocker arm enables the respective outer layer 1 or 4 to be either stretched or relaxed whenever there is a deviation from the relative position, and enables continuous movement of the outer layers 1 and 4 to be converted to a discontinuous motion.

The outer layers 1 and 4 fed in by the rocker arms in pattern-matching fashion are laid on both welded-together layers 2 and 3. The four layers 1, 2, 3, 4 then move together discontinuously and in pattern-matching fashion.

Each of the outer layers 1 and 4 here is laid on a respective side of the welded-together layers 2 and 3. As indicated here by FIG. 1, the outer layer 1 is laid against the inner layer 2, while the outer layer 4 is laid against the other side of welded-together layers 2, 3, that is, on the inner layer 3.

As described above, the transverse welds 10 and 11 of the welded-together inner layers 2 and 3 are formed only in the weld region 8, with the result that the transverse welds 10 and 11 terminate at each side at a predetermined spacing from the respective longitudinal border region 9. When the inner layers 2 and 3 are advanced, the tip of the splitter tongue 7 remains between the border regions 9, since the transverse welds 10 and 11 do not extend into the border regions 9 in FIG. 2. Each border region 9 is later removed by a longitudinal cut.

In order to weld both the outer layers 1 and 4 to the inner layers 2 and 3, both the transverse welds 10 and 11 are positioned so as to allow the splitter tongue 7 to be inserted between the inner layers 2 and 3 in a transverse direction 15 of the transverse welds 10 and 11. To this end, the splitter tongue 7 moves into the border region 9 toward the weld region 8. The splitter tongue 7 is preferably moved pneumatically by a servodrive or by a linear actuator.

As shown in FIG. 1, the outer layer 1 is welded to the adjacent inner layer 2, and the outer layer 4 is welded to the adjacent inner layer 3 by pressing a respective one of the transverse welding bars 5b and 5c in a vertical direction 12 onto the layers 1, 2, 3, 4.

The following discussion describes only a single welding of the two layers 2 and 3. The welding of layers 3 and 4 is identical.

The transverse welding bar 5b is moved in the vertical direction 12 from the rest position toward the splitter tongue 7 onto the two layers 1 and 2 that are guided into the weld region 8 such that the transverse welding bar 5b together with the splitter tongue 7 is located at the center in the region between the two transverse welds 10 and 11. After the layers 1 and 2 are welded together at the transverse weld 13, the transverse welding bar 5b again lifts off of the welded-together layers 1 and 2 by vertical movement 12.

The splitter tongue 7 inserted between the inner layers 2 and 3 prevents the two inner layers 2 and 3 from being welded together when the respective transverse welding bars 5b and 5c weld the respective outer layers 1 and 4 to the respective adjacent inner layers 2 and 3. The splitter tongue 7 here can also be viewed as a welding support against which the two transverse welding bars 5b, 5c press.

The splitter tongue 7 is then moved back from the weld region 8 into the border region 9 in the transverse direction 15, with only the tip of the splitter tongue 7 remaining within the border region 9.

The two other layers 3, 4 are welded by the other transverse welding bar 5c to form the transverse weld 14 with the same process.

The layers 1, 2, 3, 4 are then stepped in the feed direction 6, and the above-described process can be repeated.

By way of example, only four transverse welds 10, 11, 13 and 14 are illustrated.

Welding the four layers 1, 2, 3, 4 with additional transverse welds according to the invention enables compartments to be created in the packaging material between the inner layer 2 and the outer layer 1, or between the inner layer 3 and the outer layer 4.

The border region 9 is then separated from the welded layers 1, 2, 3, 4.

Another perforation line is then formed through all the welded-together layers 1, 2, 3, 4 after a predetermined number of compartments. This perforation line 17b is punched in after every three compartments located on one side in the example. Packaging materials having, for example, six compartments can be torn off along the perforation line 17b.

The motion of the produced packaging materials in the example is then converted back into a continuous motion, and the packaging materials are then rolled up into a roll.

Packaging material produced by the method according to the invention in the apparatus is then filled with bottles by inserting the bottles into the compartments created by the transverse welds 10 and 11, 12, 13, and 14. The packaging materials, which are filled with bottles and are separated by the perforation line 17b that passes through all of the welded-together layers 1, 2, 3, 4, are heated, thereby causing the plastic film of the packaging material to shrink around the bottles and secure them in place. In addition, the hot-melt adhesive 18 on the labels 16 is activated by heating and adheres to the respective bottles.

Due to the positioning of the labels 16 on the outer layers 1 and 4, they are each positioned on the packaging material such that they point outward, as viewed from the packaging material, and are positioned at the center of the respective compartment. As a result, no orientation of the bottles is required when fitted into the packaging material as the labels 16 are glued to the respective bottles since the labels 16 in the respective compartments each point outward and thus remain is uncovered.

Individual bottles can then be removed from the packaging material by pulling a bottle out of its compartment, whereby the packaging material as indicated in FIG. 3 tears along the perforation line 17a in the compartment, and also along the perforation line 17 around the label 16. The label 16 glued by the hot-melt adhesive 18 onto the bottle is torn at the same time out of the remaining packaging material since it continues to adhere to the bottle.

It is also possible under certain circumstances to form multiple rows of labels and perforations in the weld region of the layers. Here the labels and perforations are each formed successively in a row extending across the width of the layer. This enables multiple packaging materials to be produced simultaneously when welding is effected in the weld region. The respective rows are then separated from each other across the row, thereby creating packaging materials as indicated in the above-described embodiment.

It is also possible under certain circumstances for part of each of the inner layers 2 and 3 to be formed with longitudinally spaced-apart labels for articles to be packaged, for example, bottles. Here a perforation or a precut for separation from the inner layer 2 or 3 is preferably formed on the outer periphery of a label in the inner layer 2 or 3. The labels in the inner layers 2 and 3 here are preferably provided with a reactive adhesive, preferably, a hot-melt adhesive on the face of the inner layer 2 or 4 [2 or 3] turned toward the outer layer 1 or 4. The shape of the labels here is formed, preferably, punched in, and the labels are oriented in the regions of the compartments each time before transverse welding. When a bottle is removed from its compartment, the label then remains on the article to be packaged. No label is punched in the two inner layers 2 and 3 in the embodiment of FIGS. 1 through 3.

It is also possible for the packaging material to be used as an outer packaging material of layers of plastic film for containers (not shown). These layers create one or more compartments for containers. For example, it is possible for the outer packaging material in the above embodiment to be composed, for example, of four layers of plastic film. Here a part of the outer layers and/or a part of the inner layers of a compartment is formed as a longitudinally spaced label that remains on the container when the container is removed.

Figure 4:
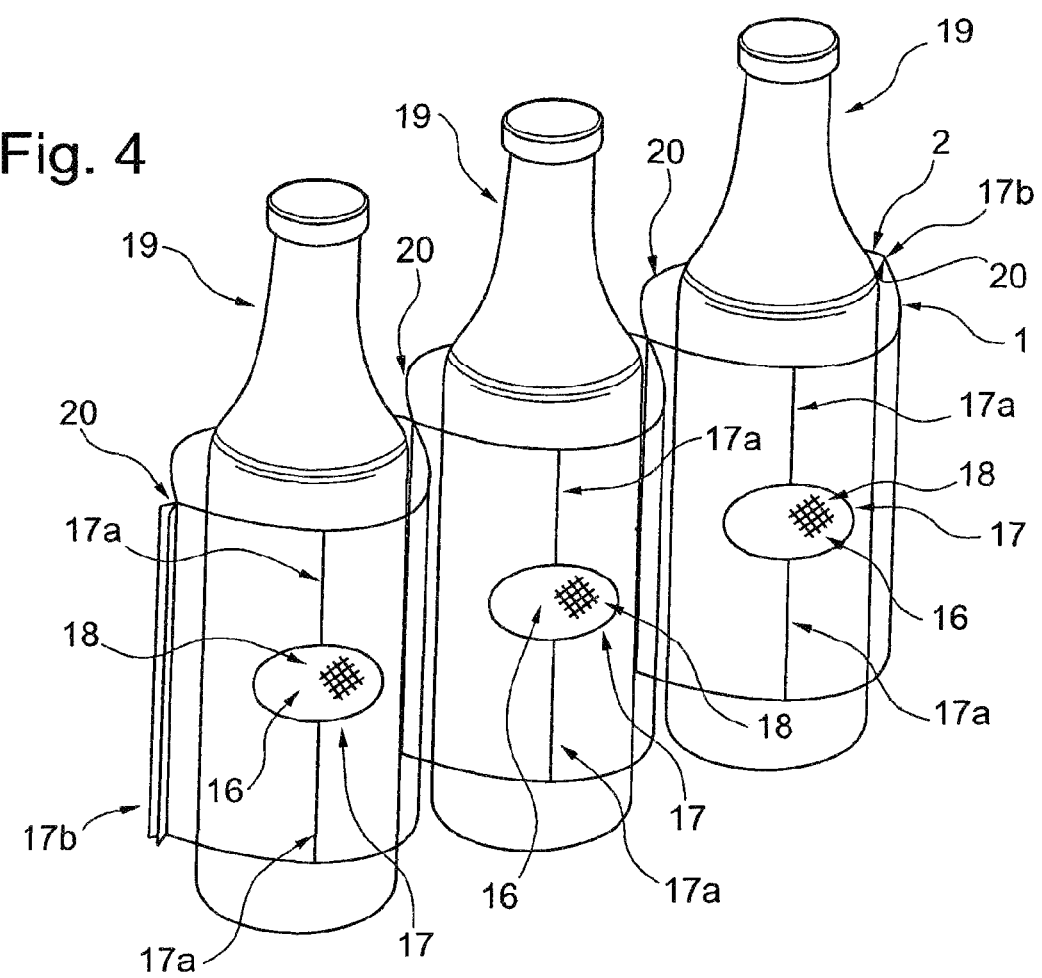
FIG. 4 shows a package with articles to be packaged before shrinking.

It is also possible to configure the packaging materials (see, for example, FIG. 22) already described in WO 2009/014248 [WO 2009/149248; US 2011/0056175] according to the invention. Based on the invention, it is possible to configure two or more compartments according to the invention. FIG. 4 shows a packaging material according to the invention for an article to be packaged, in particular containers. The packaging material in the example here accommodates three bottles 19 in each row. Identical components are provided with identical reference numerals from previously described FIGS. 1 through 3, while new components are provided with new reference numerals.

In order to produce the packaging material of plastic film in which the inner layer 2 of plastic film is welded to the outer layer 1 of plastic film by at least one transverse weld, the invention provides that part of the inner layer 2 and/or part of the outer layer 1, be formed with the label 16 for the article to be packaged. In the illustrated example, the packaging material is welded to at four transverse weld 20 so as to create compartments between the layer 2 and the outer layer 1. The shape of the labels 16 here is formed in each case before making the transverse welds 20. In the example of FIG. 4, only part of the outer layer 1 is formed with the longitudinally spaced labels 16, and perforation lines 17 for removing the labels 16 from the outer layer 1 are punched only into the outer periphery of the respective the label 16 in the outer layer 1. Each of the labels 16 for each compartment here is punched in each case with a round shape in the example. The labels 16 are also provided with a reactive adhesive in the outer layer 1, with the hot-melt adhesive 18 in the example, on the face of the outer layer 1 turned toward the layer 2. In the example of FIG. 4, the perforation lines 17a for opening the compartment are formed in the outer layer 1 each downstream of a respective transverse weld. In the example, they are punched in.

The produced packaging materials are separated from each other by the perforation line 17b that passes through both the layers 1 and 2. In the example, the perforation line 17b is punched after every three compartments. Only a part of the perforation lines 17b is shown in FIG. 4.

When bottles 19 are removed from their compartments, their labels 16 remain on the bottle 19. To accomplish this, both of the layers 1 and 2 must be shrunk around the bottle 19 by heating (not shown in FIG. 4). When the bottle 19 is removed, the perforation line 17a of the bottle's compartment tears and the label 16 tears out of the packaging material along the perforation line 17.

The invention claimed is:

1. A method of making a package of plastic film for articles to be packaged, the method comprising the steps of:
   forming in an inner layer of longitudinally extending plastic film or in an outer layer of longitudinally extending plastic film a plurality of longitudinally spaced labels each having an outer periphery;
   weakening each outer periphery by formation therein of perforations such that the outer periphery of each of the labels is releasably joined to the respective layer;
   juxtaposing the inner and outer layers;
   welding together the inner and outer layers along transverse welds between the labels so as to form between the layers a longitudinal row of compartments each having a respective one of the labels;
   inserting into each of the compartments a respective article; and
   adhering only the labels with a reactive adhesive to the respective articles such that when one of the articles is removed from the respective compartment the respective label is separated from the respective layer and stays on the removed article.

2. The method according to claim 1, wherein the inner layer is juxtaposed and welded together with another inner layer by the transverse welds, respective outer layers of plastic film are then laid on the welded-together inner layers and welded thereto by transverse welds so as to create the compartments between each of the inner layers and the respective outer layer, part of each of the outer layers or part of each of the inner layers being formed as the label for the article to be packaged.

3. The method according to claim 2, wherein the layers to be welded are welded by a transverse welding bar.

4. The method according to claim 1, further comprising the step of:
   punching a transversely throughgoing perforation line through all welded layers at a longitudinal spacing corresponding to a predetermined number of compartments.

5. The method according to claim 1, wherein a bidirectionally shrinkable plastic film is used at least for the outer layers, the method further comprising the step after inserting the articles into the compartments of:
   heating the outer layers so as to shrink same and adhere the labels to the articles.

6. An apparatus for making packaging materials of plastic film for an article to be packaged, in particular for containers, wherein the apparatus includes means for carrying out the method steps set forth in claim 1.

7. A packaging material for containers, wherein the packaging material is produced by the method of claim 1.

8. A method of making a package of plastic film for articles to be packaged, the method comprising the steps of:
   forming in each of two inner layers of longitudinally extending plastic film or in each of two outer layers of longitudinally extending plastic film a plurality of longitudinally spaced labels such that an outer periphery of each of the labels is releasably joined to the respective layer;
   juxtaposing the inner layers and welding the juxtaposed inner layers together at transverse welds;
   laying the outer layers on the inner layers and welding the outer layers at transverse welds to the respective inner layers so as to form between each of the inner layers and the respective outer layer a longitudinal row of compartments each having a respective one of the labels;

inserting into each of the compartments a respective article; and adhering only the labels to the respective articles such that when one of the articles is removed from the respective compartment the respective label is separated from the respective layer and stays on the removed article.

9. The method according to claim 8, wherein each outer periphery is weakened by forming thereat a perforation line or a precut and the labels are adhered to the respective articles by a reactive adhesive.

* * * * *